US010587697B2

(12) United States Patent
Drasin et al.

(10) Patent No.: US 10,587,697 B2
(45) Date of Patent: Mar. 10, 2020

(54) APPLICATION-SPECIFIC SESSION AUTHENTICATION

(71) Applicant: salesforce.com, inc., San Francisco, CA (US)

(72) Inventors: Benjamin Drasin, Portland, OR (US); Jacob Roussel, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 38 days.

(21) Appl. No.: 15/927,786

(22) Filed: Mar. 21, 2018

(65) Prior Publication Data

US 2019/0297147 A1  Sep. 26, 2019

(51) Int. Cl.
 *H04L 29/08* (2006.01)
(52) U.S. Cl.
 CPC .......... *H04L 67/146* (2013.01); *H04L 67/141* (2013.01)
(58) Field of Classification Search
 CPC ..................... H04L 67/141; H04L 67/146
 See application file for complete search history.

(56) References Cited

U.S. PATENT DOCUMENTS

| 2018/0013840 A1* | 1/2018 | Mitevski | H04L 67/146 |
| 2018/0075250 A1* | 3/2018 | Chasman | G06F 21/6227 |
| 2018/0173390 A1* | 6/2018 | Dunne | G06F 3/0484 |
| 2019/0057204 A1* | 2/2019 | Marcovecchio | G06F 21/335 |

* cited by examiner

*Primary Examiner* — Azizul Choudhury
(74) *Attorney, Agent, or Firm* — Holland & Hart LLP

(57) ABSTRACT

Methods, systems, and devices for application-specific session authentication are described. In some systems, a host server may authenticate a single-page application utilizing token-based verification. For example, a user device running the single-page application embedded within a container webpage may transmit a resource request including a session-identifying token to the host server. The host server may identify whether the session-identifying token is included in the resource request from the single-page application in order to determine whether to grant resource access for the request. If the request includes the token, the host server may determine that the request is from the single-page application, and may transmit the requested resources to the user device to load or update the embedded application. Using the token-based scheme, the host server may grant access to requests from the specific application, while restricting resource access to any requests received from other entities of the user device.

20 Claims, 12 Drawing Sheets

APPLICATION-SPECIFIC SESSION AUTHENTICATION

FIELD OF TECHNOLOGY

The present disclosure relates generally to database systems and data processing, and more specifically to application-specific session authentication.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some systems, a user device may run an application within a webpage (e.g., as an embedded component of the container webpage). In order to run the application, the user device may retrieve resources for the application from a server or database (e.g., associated with the cloud platform). In some cases, for data security purposes, a user device may only access these resources after passing an authentication procedure. However, authenticating the user device to access the resources for the embedded application may authenticate the entire browser session, allowing other unaffiliated applications access to the resources and resulting in security risks for the resources.

DETAILED DESCRIPTION

Figure 1:
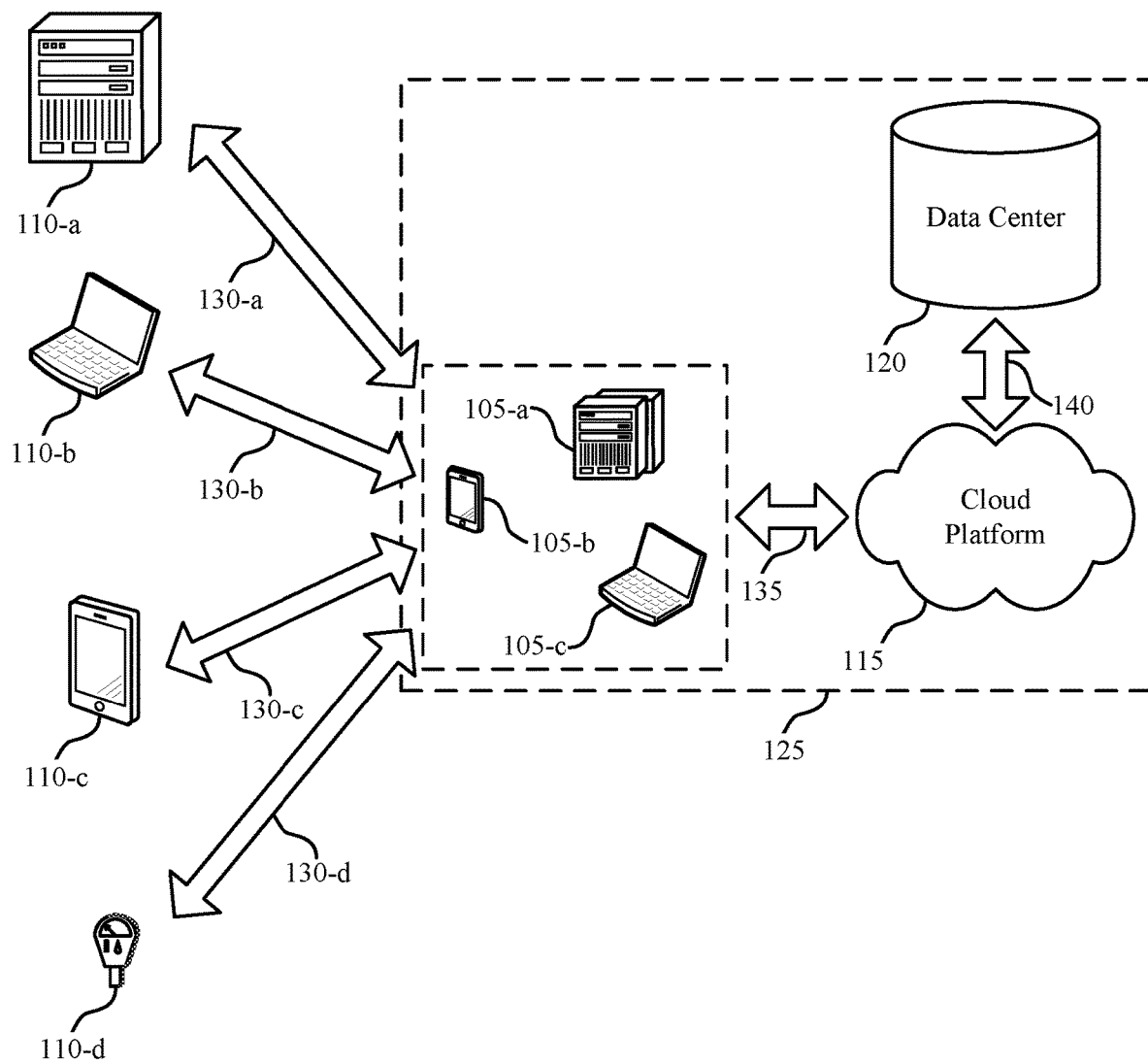
FIG. 1 illustrates an example of a system for cloud computing that supports application-specific session authentication in accordance with aspects of the present disclosure.

In some systems, a user device may implement a token based user session to support webpage components and applications embedded in a webpage. The user device may run an application within a webpage, where the embedded application and the webpage are associated with different host servers. For example, a cloud client may host a webpage using servers or code associated with that client. This webpage may be referred to as a container webpage. Within the container webpage, the user device may run an embedded application using servers or code associated with a cloud platform. For example, this embedded application may be an example of a single-page application (e.g., a snap-in or widget) that depends on resources from a host server. In some cases, the embedded application may be an example of a scheduling application (e.g., managing appointment scheduling), a chat session, a webpage or web browser plug-in, a widget, or any combination of these or other webpage-embedded applications. The user device may load and dynamically update the embedded application as a user interacts with the application based on retrieving resources from the host server.

The application may request access to resources associated with the host server for the application (e.g., a different server than the server associated with the container webpage domain). In order to access these resources associated with the host server, the user device may transmit a token to the host server. The webpage may include the token (e.g., an open authorization (OAUTH) token) in a resource request to establish and maintain a session between the application and the host server. For example, the token may be an example of a session-identifying token associated with the particular embedded application. If the application requests resources from the host server, the application may include the token in the resource request (e.g., in a header of the resource request). The host server may validate that the request came from the application based on receiving the token and establish a session with the application based on the successful validation. While the session is maintained, the host server may grant the application access to resources of the host server. The host server may transmit any requested resources to the application to load or update the embedded application in the webpage. By utilizing the token, the host server may securely authenticate the embedded application for resource access without having to grant access to the container webpage or the browser session as a whole.

In some cases, if the application requests resources from the host server and the resource request does not include the token, the host server may determine that the request did not come from the application (e.g., based on the absent token). For example, the container webpage or web browser may send a request to the host server, and the host server may restrict access to the requested resources. By including the token in resource requests for the application, but not in resource requests for the container webpage or for the entire web browser, the host server may restrict resource access to the trusted application. If a malicious user (e.g., associated with the cloud client) writes a script to retrieve resources from the host server, the resource request may be denied, as it is not sent from the embedded application and, accordingly, does not contain the token.

If the user device performs a webpage switch (e.g., from the first container webpage to a second webpage) where the second webpage contains the same single-page application, the user device may load the second webpage, and transmit another request containing the same token as the token transmitted from the first webpage. Based on the token corresponding to the same application, the request may provide the second webpage access to resources associated with the host server. The user device may continue running the application in the second webpage by using the same token and retrieved requested resources. In this way, embedded applications, such as chat windows or widgets, may continue running and limit interruptions during a webpage domain switch.

Aspects of the disclosure are initially described in the context of an environment supporting an on-demand database service. Additional aspects of the disclosure are described with respect to systems, timelines, and process flows. Aspects of the disclosure are further illustrated by and described with reference to apparatus diagrams, system diagrams, and flowcharts that relate to application-specific session authentication.

FIG. 1 illustrates an example of a system 100 for cloud computing that supports application-specific session authentication in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some systems 100, subsystem 125 may support application-specific session authentication. For example, a host server—which may be a component of the cloud platform 115—may authenticate a user device (e.g., a cloud client 105 or contact 110) to access resources associated with the host server (e.g., resources needed to display a web page, a login service, or a secure application) using a token (e.g., a session-identifying token). For example, the user device may initially transmit a resource request to the host server. This resource request may include a token (e.g., in a resource request header) and an indication of the requested resources. The host server may use the token to identify whether the resource request is received from an authorized application. For example, the host server may trust and provide resources for a single-page application embedded in the webpage. The host server may establish an application-specific session with the single-page application, where the session allows the application to retrieve resources from the host server. During this application-specific session, the single-page application may be authorized to access resources associated with the host server based on including the session-identifying token in any resource requests, while webpages not associated with or trusted by the host server may not be authorized to access the resources (e.g., based on resource requests for these webpages not including the session-identifying token). The host server may transmit the requested resources to the user device based on the established authenticated session.

In some cases, the host server may host cross-domain storage for the user device. In these cases, the user device may store the session-identifying token in the cross-domain storage. If, after establishing the session, the user device switches webpages, the user device may transmit another request for resources to the host server, where this request may include the same token (e.g., retrieved from cross-domain storage) included in the resource request from the first webpage. The host server may maintain the application specific-session, and may return the requested resources based on receiving the session-identifying token. For example, the second webpage may include the same embedded single-page application as the first webpage. The user device may continue running this application in the second webpage by retrieving the requested resources based on the host server identifying the same token. In this way, embedded applications, such as chat windows, plug-ins, widgets, etc., may continue running with limited interruptions during a webpage domain switch.

In conventional systems, a user device and host server may use session identifier (SID) cookies associated with the host server to establish and maintain user sessions for a web application. These cookies may be sent with any request from the web browser to its associated domain (e.g., the host server), whether these requests originate from an embedded application (e.g., the snap-in) or not. Accordingly, SID cookies may not keep the authentication context confined to the snap-in application, and may allow the entire webpage, domain, or browser to access resources for the host server using the cookies. A malicious user may perform resource requests using the web browser, and may gain access to resources of the host server using the SID cookies. In one specific example, outside administrators may include an outlet (e.g., a link) in a webpage to access information (e.g., in order to steal the information, modify the information, etc.) associated with the host server via a transmitted request that includes the SID cookie. In this way, implementing SID cookies may introduce security risks to the host server resources.

Alternatively, certain conventional systems may implement session-identifying tokens in fields for forms or parameterized uniform resource locators (URLs). However, implementing tokens in this way may authenticate page-based applications, but not single-page applications. That is, single-page applications may use programmable code (e.g., JavaScript) to avoid constant webpage reloads. However, webpage rewriting initiated by a session-identifying token used in fields in forms or fields in parameterized URLs may trigger webpage reloads, which may greatly increase the latency of webpage or application updates. In addition, applications utilizing the session-identifying tokens in fields for forms or parameterized URLs may not be compatible with secure cross-domain storage, and thus may not maintain sessions between different domains.

The system 100 may utilize session-identifying tokens in resource requests to support secure, application-specific sessions across web domains. As the tokens may be sent exclusively for resource requests from an embedded application, the host server may securely authenticate the embedded application for resource access without having to grant access to the larger webpage or other webpages of the browser. In addition, because the token included in the request may be stored in a cross-domain storage, the session may span one or more webpages that include the embedded application. The user device may initiate an authenticated session with the host server and associate the session with the embedded application, thereby protecting resources and data at the host server from any requests sent outside of the approved application. In this way, system 100 may support embedded applications with secure resource access capabilities and low updating latencies.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
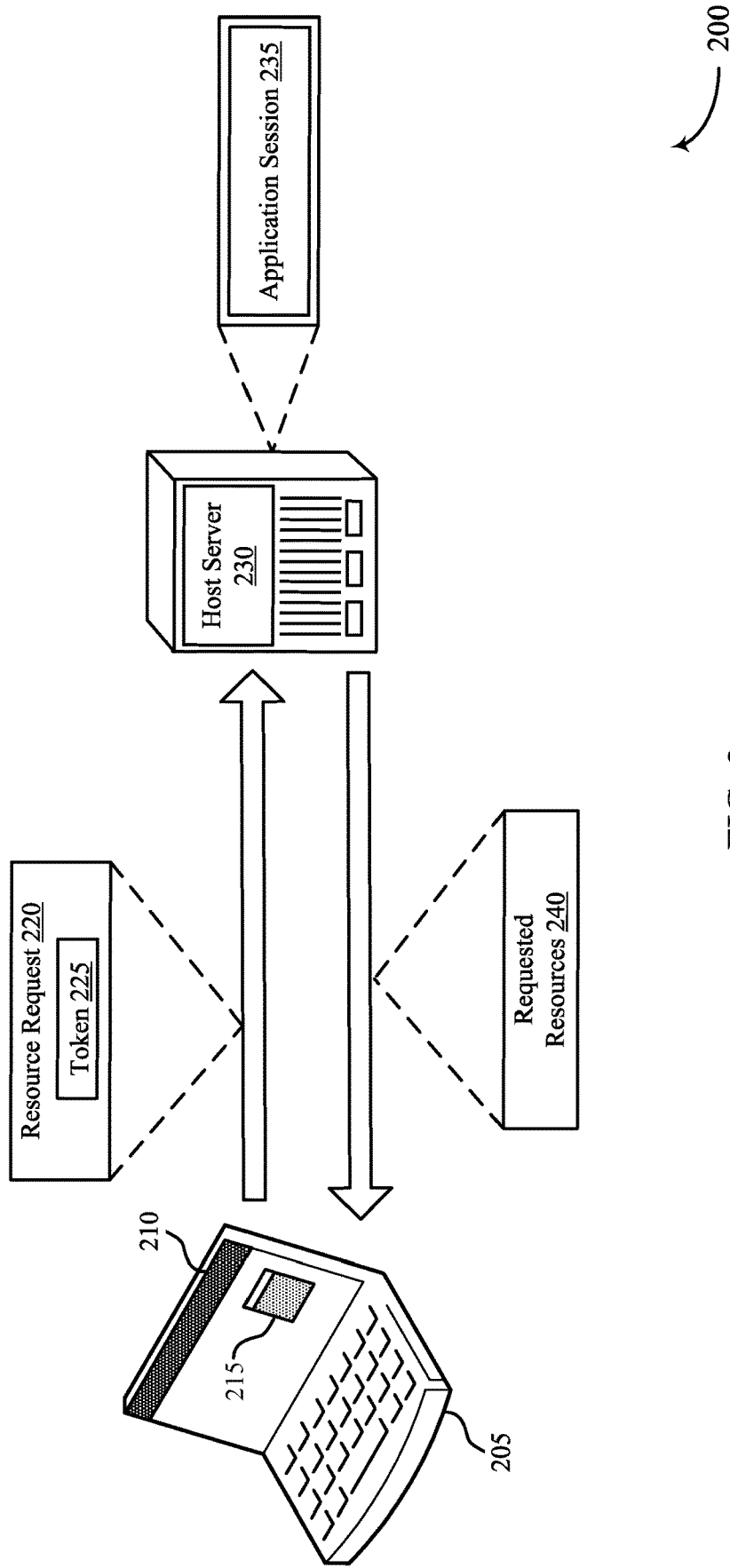
FIGS. 2 and 3 illustrate examples of systems that support application-specific session authentication in accordance with aspects of the present disclosure.

FIG. 2 illustrates an example of a system 200 that supports application-specific session authentication in accordance with various aspects of the present disclosure. The system 200 may include a user device 205 and a host server 230. The user device 205 and the host server 230 may be components of the subsystem 125, as described with reference to FIG. 1. For example, the user device 205 may be an example of a cloud client 105, while the host server 230 may be a component of the cloud platform 115. The host server 230 may be an example of a single server or a server cluster, or may be an example of one or more software modules implemented within other devices.

The user device 205 may display a container webpage 210, which may not be associated with the host server 230. For example, the container webpage 210 may be owned and operated by a first organization. The first organization may provide resources (e.g., using a server associated with the first organization) for running the container webpage 210 in a web browser of the user device 205. This first organization may be a client or tenant of the host server 210, and may include one or more applications 215 within the container webpage 210. The application 215 may be an example of a single-page application, and may be executed using resources owned or managed by the host server 230. For example, the host server 230 may have access to data stored in a data center (e.g., such as a data center 120, as described with reference to FIG. 1), and may manage requests for this data. For the application 215 to run within the container webpage 210, the application 215 may retrieve resources (e.g., tenant data, code, global parameters, etc.) from the host server 230.

The application 215 may be an example of a snap-in application embedded in the container webpage 210. In some cases, the application 215 may be an example of a single-page application; however, the application 215 may occupy a portion of the container webpage 210. In some cases, the container webpage 210 may be associated with a first domain (e.g., corresponding to the first organization), and the application 215 may be associated with a different domain (e.g., corresponding to a second organization running the host server 230). In some examples, the application 215 may include a user interface to schedule appointments, attend live chat sessions, or the like. For example, the application 215 may include a user interface to schedule an appointment via a calendar, select a preferred time slot for an appointment, modify a scheduled appointment (e.g., reschedule, cancel, etc.), or search for other information related to an appointment (e.g., location, technician information, etc.). The information associated with each user's appointment may be separated for increased security, and stored at the host server 230 or a database or data store associated with the host server 230. To retrieve this information, the user device 205 may transmit a resource request 220 with a token 225 associated with the application 215 to the host server.

In some cases, the resource request may be an example of a request to establish an application-specific session between the user device 205 and the host server 230. The resource request 220 may include the token 225 (e.g., a session-identifying token) based on the resource request 220 corresponding to the application 215. For example, when generating the resource request 220, the user device 205 may determine that the resource request 215 retrieves information for the application 215 embedded in the container webpage 210. The user device 205 may identify any token 225 stored in memory for the application 215, and may add the token 225 to the resource request 220. This token 225 may indicate that the resource request 220 originated from the application 215, and not from any other application or script in the container webpage 210 or in other webpages of the web browser. The resource request 220 may additionally include an indication of requested resources to retrieve from the host server 230 (e.g., in order to run or update the application 215).

In some cases, the token 225 may be an example of an OAUTH token that may be included in the header of the resource request 220. For example, the token 225 may be added as a header (e.g., in a referer field), and may not affect the other contents of the request or query. In some examples, the resource request 220 may be an example of an XMLHttpRequest (XHR). If the application 215 is a single-page application, each resource request 220 may be an example of an XHR (e.g., as opposed to a form submission or a surfing link). XHRs may utilize hypertext transfer protocol (HTTP) to enable communications between the user device 205 and the host server 230. In some examples, the HTTP may serve as a request-response protocol between the user device 205 and the host server 230.

The host server 230 may receive the resource request 220 with the token 225. The host server 230 may identify the token 225 included in the header of the resource request 220 and grant access to the resources for the associated application 215. In some examples, the host server 230 may determine that the resource request 220 is transmitted from the application 215 embedded within the container webpage 210 based on this token 225. The host server 230 may establish an application session 235 for the user device 205 (or for the user operating the user device 205) if an application session 235 does not exist. The application session 235 may grant the application 215 access to resources associated with the host server 230. In some cases, the application session 235 may grant the application 215 access to a subset of resources associated with the host server 240, for example, application-specific resources, tenant-specific resources, or a combination thereof. The host server 230 may transmit the requested resources 240 to the user device 205. For example, the requested resources 240 may be indicated in the resource request 220 and associated with running the application 215 embedded within the container webpage 210. The user device 205 may run the application 215 based on retrieving these requested resources 240 from the host server 230.

Figure 3:
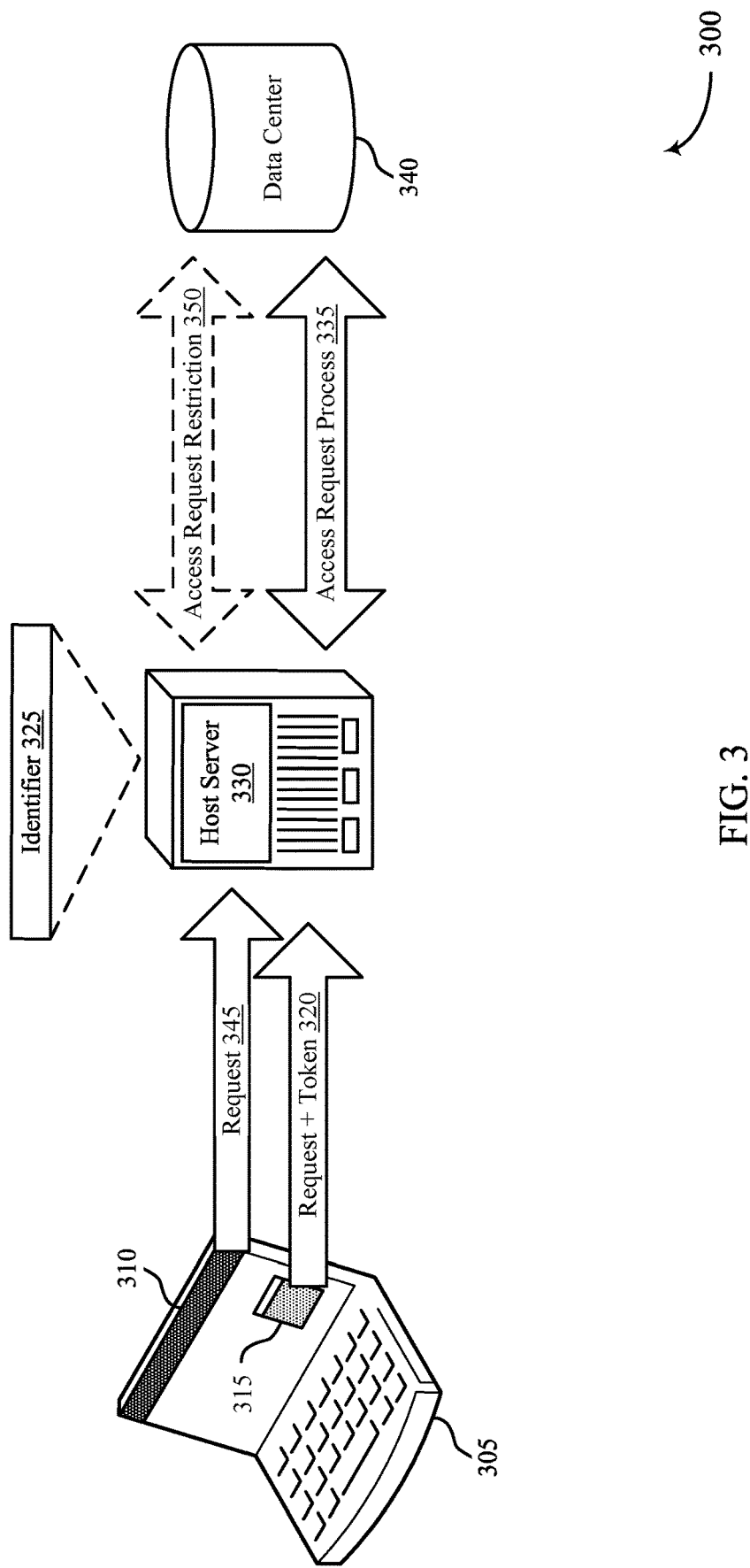

FIG. 3 illustrates an example of a system 300 that supports application-specific session authentication in accordance with various aspects of the present disclosure. The system 300 may include a user device 305, a host server 330, and a data center 340, which may be examples of the corresponding devices described with respect to FIGS. 1 and 2. The user device 305 may include a container webpage 310 and an application 315, which may be examples of the corresponding components described with respect to FIG. 2. The container webpage 310 may be supported by a first server associated with a tenant of the data center 340, while the application 315 may be supported by the host server 330 associated with the data center 340. The user device 305 may transmit requests to the host server 330. For example, the application 315 may generate the request 320 to transmit to the host server 330.

A user operating the user device 305 may perform a user login procedure to obtain a token for authenticated resource access. This token may be an example of a session-identifying token, such as an OAUTH token. To obtain the OAUTH token, the user may perform a login procedure associated with the container webpage 310. For example, the tenant hosting the container webpage 310 may grant the user a user-specific or application-specific OAUTH token if the user passes the login procedure. Additionally, the container webpage 310 may initialize a user session for the user, and may associate the OAUTH token with the user session. This user session may correspond to a session between the user of user device 305 and the host server 330.

The host server 330 may be configured with an authentication endpoint for the tenant. For example, the tenant may upload a tenant-specific encryption key to the host server 330, where the key may be derived based on any number of key derivation algorithms or tenant specified inputs. In some cases, this key may not be stored at the host server 330, and instead may be securely stored in the data center 340. When the user of user device 305 passes the login procedure for the tenant, the tenant may generate a bundle for creating a user session at the host server 330. The tenant may modify (e.g., sign, wrap, encrypt, etc.) this bundle using the encryption key, and may transmit the bundle to the host server 330. The host server 330 may use the tenant-uploaded encryption key to unbundle the information. In some cases, the host server 330 may try to decrypt the bundle using multiple different tenant-specific encryption keys until one of the keys successfully decrypts the information. The host server 330 may determine that the bundle was received from the tenant corresponding to the successful tenant-specific key. The host server 330 may initiate an application-specific session for a user of that tenant. The encryption key may be utilized to identify a tenant for each resource request, or may be utilized for the initial session generation, and subsequent requests 320 may just use the obtained OAUTH token.

In some cases, the host server 330 may store data in cross-domain storage. This cross-domain storage may keep information accessible for the user device 305 when the user device 305 switches between webpages of different web domains. In some cases, the host server 305 may make data stored in cross-domain storage accessible to different sub-domains of a same root domain. For example, if the user device 305 stores information in cross-domain storage for a webpage corresponding to a root domain, this information may be available to any webpages corresponding to subdomains of that root domain (e.g., such as support pages off of a main website). In some cases, the information may not be available to webpages that are not associated with the root domain.

The user device 305 may store the session-identifying token (e.g., the OAUTH token) in this cross-domain storage. For example, a user operating user device 305 may obtain the token based on a login procedure (e.g., as described above), and the user device 305 may store the token in the cross-domain storage (e.g., using a programmable code, such as JavaScript). When the application 315 requests resources from the host server 330, the user device 305 may retrieve the token from cross-domain storage, and may send the token with the request 320 to the host server 330. If the user device 305 switches container webpages 310, the host server 330 may maintain a copy of the token in the cross-domain storage, and may pass another copy of the token to the web browser to be used for application-specific resource requests. If the new container webpage 310 has access to the cross-domain storage (e.g., if the new container webpage 310 is related to the initial container webpage 310) and includes the embedded application 315, the user device 305 may obtain the token from cross-domain storage (e.g., via the web browser) and include the token in any resource requests 320 from this application 315.

In some cases, the token may be removed from the cross-domain storage based on a user logout procedure. For example, the user may logout of the application 315 or the container webpage 310. If the user logs back in, the user may receive a new token to access the requested resources, and the user device 305 may add this new token to the cross-domain storage. The host server 330 may host the cross-domain storage for the container webpage 310, the application 315, or both. In some examples, the host server 330 may store session data for the container webpage 310, the application 315, or both in the cross-domain storage.

In some systems 300, the host server 330 may include an identifier 325, which may also be referred to as an identifying component. The identifier 325 may be a component of the host server 330 implemented in hardware, software executed by a processor, firmware, or any combination thereof. The identifier 325 may identify that the request 320 is received from the application 315 and not, for example, from the container webpage 310. For example, the identifier 325 may check each received request for an application-specific token. If the identifier 325 identifies a token in a received request 320, the host server 330 may determine that the request is from the application 315. The host server 330 may then initiate an access request process 335 with the data center 340. In some examples, the data center 340 may store the requested resources included in the request 320 in memory (e.g., in tables, files, data objects, etc.). If the host server 330 identifies the token included in the request 320, the host server 330 may retrieve the requested resources from the data center 340. For example, the user device 305 may be authenticated for the application 315 embedded in the container webpage 310. The host server 330 may transmit the requested resources to the user device 305 in response to the request 320 and based on the access request process 335.

In some cases, the host server 330 may transmit a SID cookie (e.g., a session-identifying cookie) to the container webpage 310 based on establishing the application-specific session with the application 315. For example, the host server 330 may establish the application-specific session based on receiving the token—and, in some cases, based on cryptographic signing—and may identify further requests from the application 315 based on receiving the SID cookie. In some cases, the host server 330 may transmit the SID cookie with a response (e.g., modifying the application-specific session context from a token-based session to a cookie-based session). The user device 305 may receive the SID cookie, and may associated the SID cookie with the web browser. If the user device 305 switches container webpages 310, the SID cookie may remain associated with the web browser (e.g., as opposed to being associated with a specific container webpage 310 or application 315). The host server 330 may receive additional requests including the SID cookie, and may allow access to resources based on identifying the SID cookie.

In other examples, the user device 305 may transmit a request 345 (e.g., an additional resource request) to the host server 330. This request 345 may be initiated by the container webpage 310 or the web browser. As the request 345 is not initiated by the application 315, the user device 305 may not add the token to this request 345. That is, the request may include only an indication of additional requested resources associated with the host server 330. The host server 330 may receive the request 345 and determine that the request 345 does not include the token. For example, the identifier 325 may identify that the request 345 is received from the container webpage 310 or some other webpage of the web browser rather than from the application 315. Accordingly, the request 345 may be considered unauthenticated by the host server 330. The host server 330 may restrict access to the additional requested resources using an access request restriction procedure 350 based on the request 345 not originating from the trusted application 315.

In this way, the user device 305 and host server 330 may implement application-specific request authentication. For example, the host server 330 may individually verify each request received from the user device 305, as opposed to implementing browser-wide verification. By verifying each request, and by attaching the session-identifying tokens just to requests from the application 315, the host server 330 may differentiate between requests for resources from the application 315, and requests for resources from other entities. The host server 330 may accordingly authenticate and trust requests 320 from the application 315, while not authenticating or trusting other requests 345 from the user device 305. Such a procedure may guard against malicious attacks from the web browser (e.g., by not allowing other applications running in the web browser to access the resources in data center 340), while allowing the application 315 associated with the host server 330 to retrieve the necessary resources to run as a snap-in application.

Figure 4:
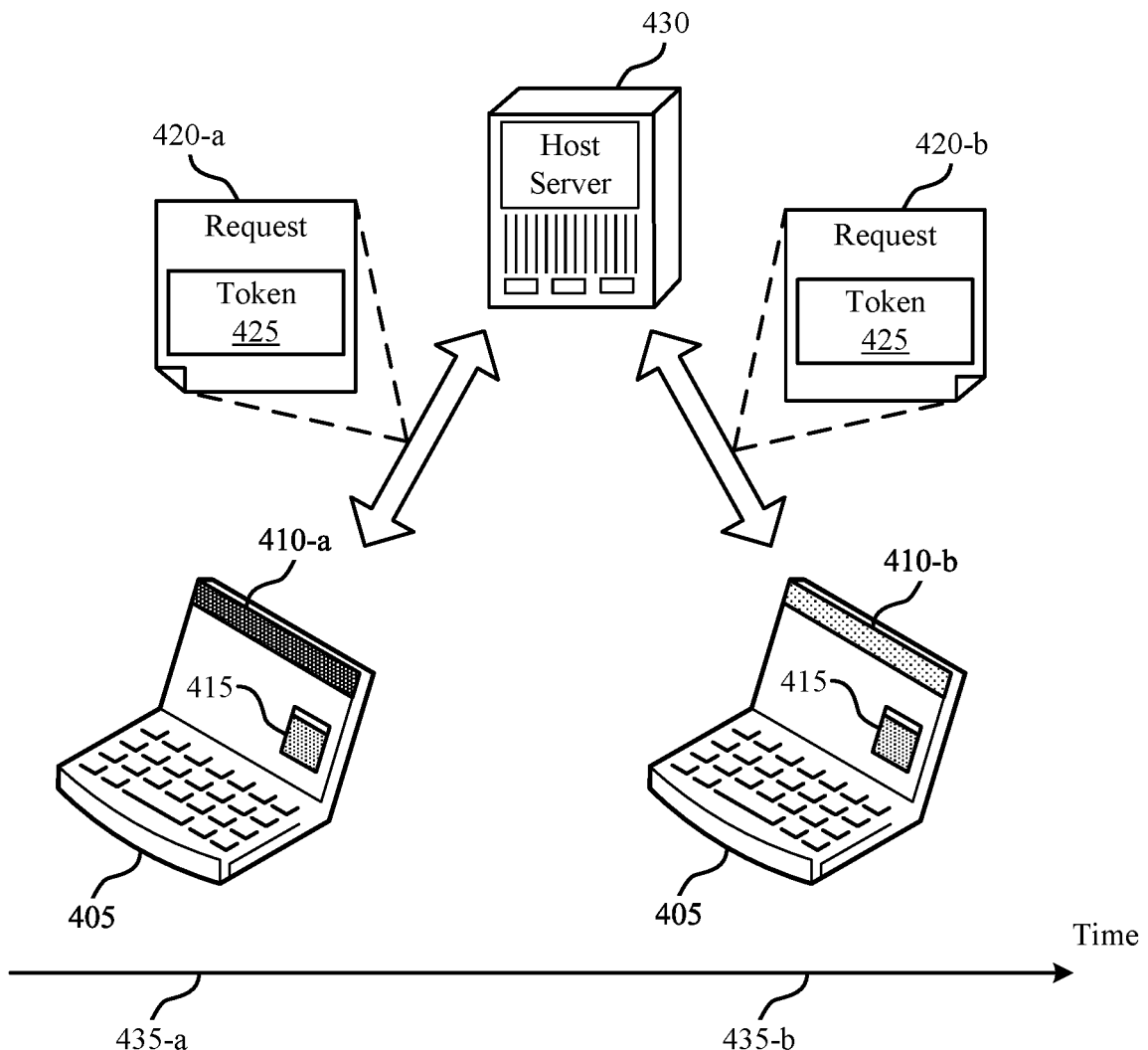
FIG. 4 illustrates an example of a timeline that supports application-specific session authentication in accordance with aspects of the present disclosure.

FIG. 4 illustrates an example of a timeline 400 that supports application-specific session authentication in accordance with various aspects of the present disclosure. The timeline 400 may illustrate a user device 405 switching from a container webpage 410-*a* at time 435-*a* to a different container webpage 410-*b* at time 435-*b*. Each container webpage 410 may include a same embedded application 415, which may be persisted across the webpages 410 using cross-domain storage. User device 405 may be an example of a cloud client 105 or a user device as described with reference to FIGS. 1 through 3.

At time 435-*a*, the user device 405 may run a single-page application 415 in container webpage 410-*a*. The single-page application 415 may occupy a portion of the container webpages 410, and may be an example of a stateful web application. For example, the single-page application may be a live chat session, an appointment scheduler, or some similar application. The single-page application 415 may depend on resources managed by a host server 430. For example, loading or updating the application 415 may involve retrieving data or code from the host server 430. To securely retrieve this information from the host server 430, the user device 405 may use an application-specific token 425 for origination verification. The token 425 may be associated with a trusted application 415 instance during a user session. If the application 415 generates a request 420-*a* to retrieve resources from the host server 430, the user device 405 may attach the token 425 to the request 420-*a*. In some examples, the user device 405 may insert the token 425 into the header of request 420-*a*. A script or executable code in container webpage 410-*a* may create request 420-*a*, and may include an indication of requested resources and the token 425. The host server 430 may receive request 420-*a*, and may identify that the request 420-*a* is received from the application 415 based on the token 425. The host server 430 may accordingly grant the application 415 access to the necessary resources for running the application 415. In some cases, the user device 405 may send multiple requests 420 to the host server 430 for iteratively updating the application 415 embedded in container webpage 410-*a* (e.g., as a single-page application, without full page reloads).

At time 435-*b*, the user device 405 may perform a container webpage 410 switch from container webpage 410-*a* to container webpage 410-*b*. For example, the container webpage 410 switch may be based on a user input to the user device 405 (e.g., a user may select a link in container webpage 410-*a* that takes the web browser from container webpage 410-*a* to container webpage 410-*b*). In some cases, container webpage 410-*a* and container webpage 410-*b* may exist in a same domain. However, in other cases, container webpage 410-*a* and container webpage 410-*b* may exist in different domains. For example, container webpage 410-*a* and container webpage 410-*b* may correspond to different hierarchical address spaces (e.g., a first domain and a second domain, respectively). In these cases, container webpage 410-*a* and container webpage 410-*b* may exist in related or unrelated domains. If the container webpages 410 exist in unrelated domains, user device 405 may not continue running an existing application 415 in container webpage 410-*b* following the switch (e.g., for security reasons, the host server 430 may authorize use of the application 415 within a specific root domain, and may perform a re-authorization procedure if the user device 405 switches to a domain outside the umbrella of this root domain). Alternatively, if container webpage 410-*a* and container webpage 410-*b* exist in different but related domains (e.g., where both web domains share a same root domain), the user device 405 may be able to reload the single-page application 415 in container webpage 410-*b*.

For example, the user device 405 and the host server 430 may utilize secure cross-domain storage to persist the application 415 across different web domains. In some examples, the single-page application 415 may periodically or aperiodically store an indication of its current state so that when the user device 405 switches to a different container webpage 410-*b* at time 435-*b*, the user device 405 may recreate the single-page application 415 in the same state. This current state may be stored at the user device 405 or in cross-domain storage hosted by the host server 430. The stored indications may include any data or information needed to reload the application 415 to the current state, including the token 425. For example, for a live chat session application, user device 405 may store a chat transcript, a chat state, a widget state, widget banner text, unread notifications, or any combination of this information. The data stored in cross-domain storage may be associated with a specific application (e.g., application 415), a specific user session (e.g., the user session initiated for the user operating user device 405), one or more specific root domains, or a combination thereof.

If container webpage 410-*b* includes the same embedded application 415 as container webpage 410-*a*, the user device 405 may utilize this cross-domain storage to reload the application 415 while maintaining the established user session. For example, as described above, at time 435-*a* the user device 405 may transmit request 420-*a*, including token 425, to the host server 430 to load the application 415 in container webpage 410-*a* (e.g., using resources managed by the host server 430). The user device 405 may additionally store the token 425 and the loaded application state in cross-domain session storage maintained by the host server 430. If, at time 435-*b*, the user device 405 switches to a different webpage 410-*b* containing the application 415, the user device 450 may search for previously existing application data (e.g., a token 425, an application state, etc.) in the cross-domain session storage. The user device 405 may identify the application data for the application 415 based on an ongoing user session, a domain of the container webpage 410-*b* (e.g., where container webpages 410-*a* and 410-*b* share a root domain), the application type, or some combination of these or other similar parameters.

The user device 405 may send request 420-*b* with the token 425 (e.g., retrieved from cross-domain session storage) to reload the application 415. The user device 405 may reload the application 415 based on the stored application state, resources managed by the host server 430, or a combination thereof. In some cases, associating the user device 405 with the single-page application 415 may not persist when the user device 405 switches to container webpage 410-*b* using the same single-page application 415. In these cases, the user of the user device 405 may perform an additional authorization procedure to regain access to the host server 430 resources. In other cases, based on the cross-domain session storage, the single-page application 415 may continue running on the user device 405 uninterrupted following the webpage switch (e.g., according to an uninterrupted user session). Once the application 415 is reloaded in the container webpage 410-*b*, the user device 405 may send any additional resource requests 420-*b* for the application 415 to the host server 430 with the token 425 attached (e.g., as long as the user session persists). For example, executable code at new container webpage 410-*a* may recognize the existing session-identifying token (e.g., in cross-domain storage) and send it with each XHR originating from the application 415. In this way, the authenticated session for the application 415 may continue on webpage 410-*b* transparently to the end user.

In some cases, the user device 405 may be in multiple different states between time 435-*a* and time 435-*b*. For example, the web browser may change multiple times to different webpages 410, each of which may or may not contain the application 415. As long as the user session remains valid and the token is stored in cross-domain storage, each webpage 410 containing the application 415 may be granted access to host server 430 resources (e.g., specific to the application 415, rather than the webpage 410 or browser as a whole), while each webpage 410 not containing the application 415 may not be granted access to the host server 430 resources. In this way, the user device 405 may load an application 415 using resources from the host server 430 in a first webpage 410, transition to a number of webpages 410 without reloading the application 415 (e.g., if the application 415 is not embedded in these webpages 410), and then reload the application 415 in its most recent state upon loading a container webpage 410 once again containing the application 415.

Figure 5:
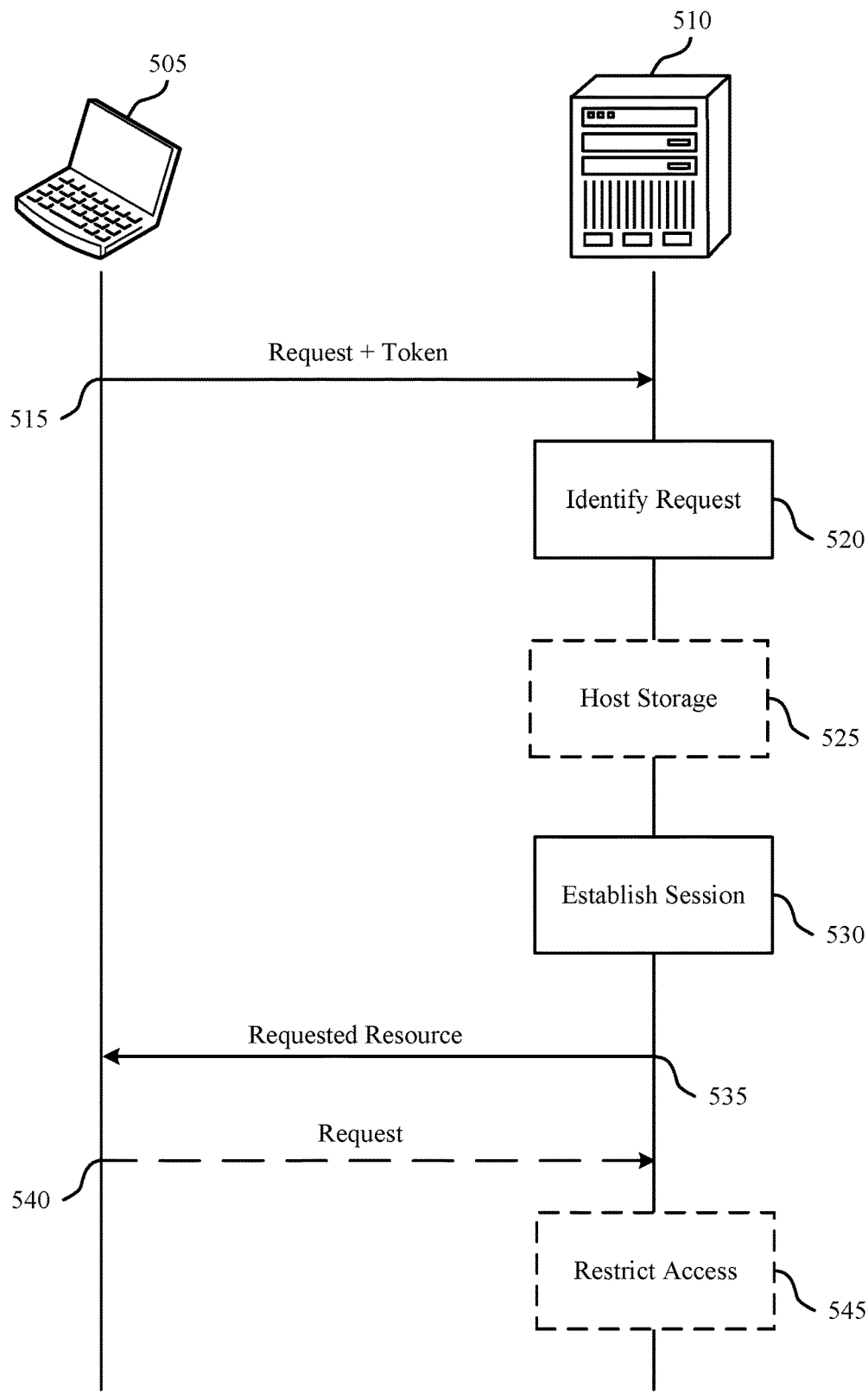
FIGS. 5 and 6 illustrate examples of process flows that support application-specific session authentication in accordance with aspects of the present disclosure.

FIG. 5 illustrates an example of a process flow 500 that supports application-specific session authentication in accordance with various aspects of the present disclosure. The process flow 500 may include a user device 505 and a host server 510. The user device 505 and the host server 510 may be examples of the corresponding devices described with respect to FIGS. 2 through 4. The user device 505 may include a container webpage and an embedded application (e.g., also as described with respect to FIGS. 2 through 4). Alternative examples of the following may be implemented, where some steps are performed in a different order than described or not performed at all. In some cases, steps may include additional features not mentioned below, or further steps may be added.

At 515, the user device 505 may transmit a request (e.g., a resource request, such as an XHR) to the host server 510. The request may include a session-identifying token—which may be broadly referred to as a token—and an indication of requested resources. The session-identifying token may be an example of an OAUTH token. In some cases, the session-identifying token may be included in a header of the request.

At 520, the host server 510 may identify that the request is received from a single-page application embedded in a container webpage. The identifying may be based on receiving the session-identifying token with the request.

At 525, the host server 510 may host cross-domain session storage for the container webpage associated with user device 505. In some cases, the host server 510 may store session data for the container webpage (e.g., for the application embedded in the container webpage) in the cross-domain session storage. For example, the host server 510 may store the session-identifying token in the cross-domain session storage based on a user login procedure. This session-identifying token may eventually be removed from the cross-domain session storage based on a user logout procedure.

At 530, the host server 510 may establish an application-specific session for the embedded single-page application based on identifying that the request is received from the single-page application embedded in the container webpage. The application-specific session may grant the single-page application access to resources associated with the host server 510. In some cases, the application-specific session grants the single-page application access to tenant-specific resources for a tenant (e.g., corresponding to the user of the user device 505) and associated with the host server 510. At 530, the host server may grant the application access to a subset of the resources associated with the host server 510. In some cases, the subset of the resources are based on permissions for the single-page application.

At 535, the host server 510 may transmit one or more requested resources to the single-page application associated with the user device 505 based on the established session. The requested resources may be indicated by the request received at 515. In some cases, the host server 510 may transmit a session-identifying cookie to the container webpage associated with the user device 505 based on establishing the application-specific session with the single-page application, and the single-page application may utilize the session-identifying cookie for further resource requests to the host server 510.

For example, in some cases, the user device 505 may transmit a request (e.g., an additional resource request) to the host server 510 at 540. If this additional request is generated by the embedded application, the user device 505 may include the session-identifying token or the session-identifying cookie in the request. The host server 510 may transmit the requested resources in response if the request includes the token or the cookie. In some cases, the additional resource request may refer to a different container webpage associated with the user device 505 than the request received at 515. However, the additional request may include the session-identifying token based on cross-domain session storage at the host server 510. For example, the first request may be received from the application embedded in a first container webpage corresponding to a first web domain, and the additional request may be received from the application embedded in a different container webpage corresponding to a second web domain different from the first web domain. As long as the application-specific session is maintained, and the request contains either the token or the cookie, the host server 510 may grant the application access to the requested resources (e.g., despite the domain change of the container webpage).

If this additional resource request is not generated by the application, the additional resource request may not include the session-identifying token or the session-identifying cookie. Instead, the request may include an indication of additional requested resources associated with the host server 510. At 545, the host server 510 may restrict access to the resources associated with the host server 510. For example, the host server 510 may determine that the additional request does not include the session-identifying token, and therefore was not generated by the embedded application. Instead, the additional request may have been generated by the container webpage or another webpage of the browser. The host server 510 may restrict access to the additional requested resources based on this determination.

Figure 6:
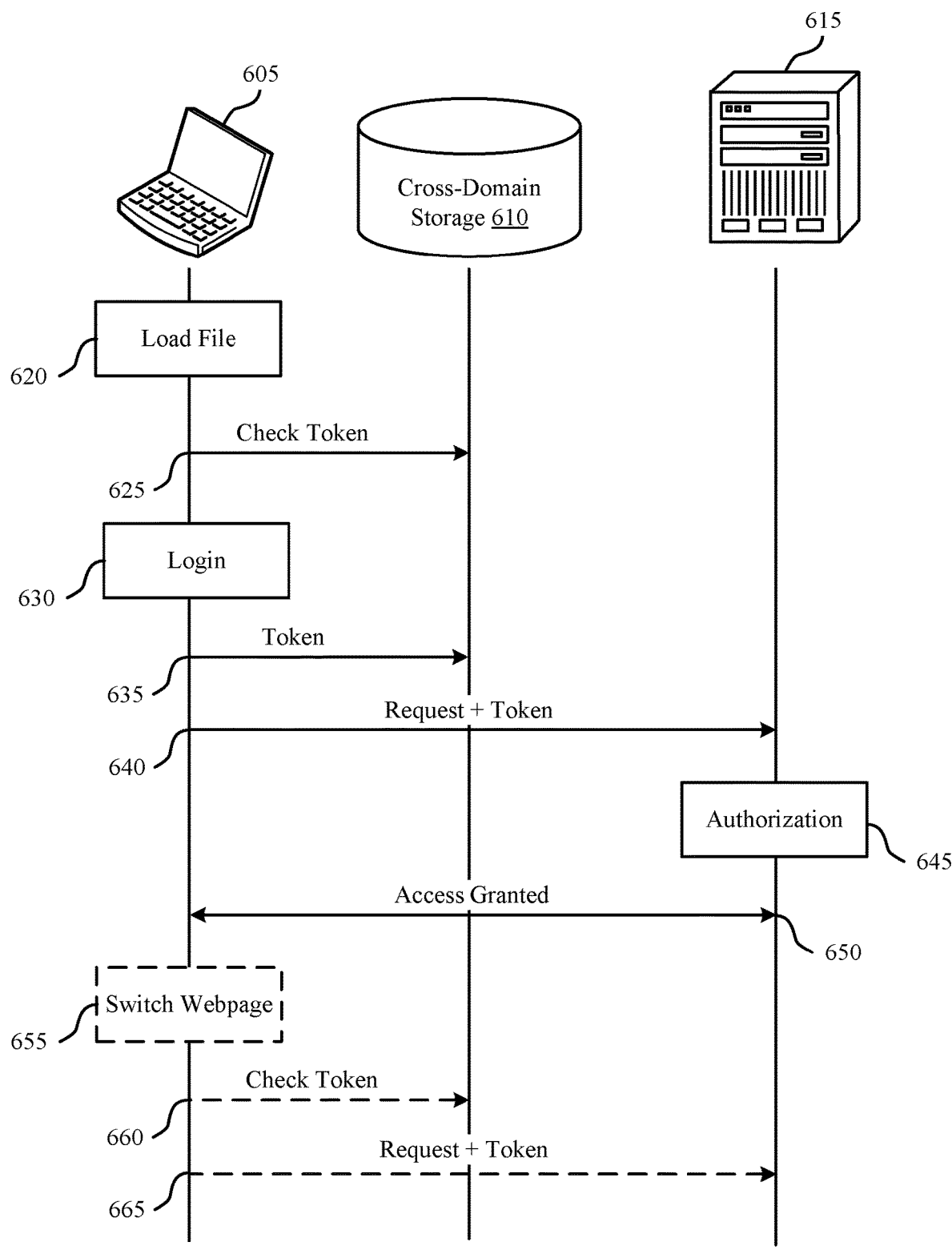

FIG. 6 illustrates an example of a process flow 600 that supports application-specific session authentication in accordance with various aspects of the present disclosure. The process flow 600 may include a user device 605, cross-domain storage 610 (e.g., on disk, in memory, etc.), and a host server 615. The user device 605 and host server 615 may be examples of the corresponding devices described with respect to FIGS. 2 through 5. The user device 605 may include a container webpage as described with respect to FIGS. 2 through 5. Alternative examples of the following may be implemented, where some steps are performed in a different order than described or not performed at all. In some cases, steps may include additional features not mentioned below, or further steps may be added.

At 620, the container webpage associated with the user device 605 may load a file (e.g., a single-page application). The file may be an example of a JavaScript file for running the single-page application as a snap-in within a webpage. In other cases, the file may be an example of programmable code utilizing a different programming language (e.g., Java, C++, etc.).

At 625, the user device 605 may check if a token is present (e.g., an existing OAUTH token stored in cross-domain storage 610). The user device 605 may determine that there is no token in cross-domain storage 610 corresponding to the single-page application. At 630, the user device 605 may present a login form (e.g., supporting a user login procedure) based on the token not being present. The user operating user device 605 may complete the login procedure (e.g., by inputting user credentials, such as a username, password, biometric input, personal identification number (PIN), or some combination of these or other similar user credentials into the login form). The user device 605 may receive a token in response to a successful user login procedure. The user device 605 may set this token in the code file for loading the single-page application.

At 635, the user device 605 may transmit (e.g., copy) the token to cross-domain storage 610. For example, the code file may copy the token to the cross-domain storage 610. The cross-domain storage 610 may store the token in memory, where the token may be associated with a specific application, user, user device 605, or some combination of these.

At 640, the user device 605 may transmit a request which includes the token to the host server 615 to initialize the application. In some cases, the token may be included in a header of the request. At 645, the host server 615 may authorize the user device 605 for access to secure resources. For example, the host server 615 may identify that the request includes the token and may establish an application-specific user session for the single-page application.

At 650, the host server 615 may grant the user device 605 access to resources to initialize the single-page application (e.g., as a snap-in within the container webpage). In some examples, the host server 615 may transmit requested resources to load the single-page application at the user device 605. In other examples, granting access at 650 may grant the single-page application access to information associated with the user (e.g., tenant-specific resources) and associated with the host server 615 or access to a subset of requested resources. If the single-page application is initialized and the session established, subsequent requests from the single-page application to the host server 615 may include the same token as the token included in the initial request.

At 655, the user device 605 may switch container webpages to a different webpage (e.g., of a different web domain) containing the embedded single-page application. In these cases, the user device 605 may again load the file. At 660, the user device 605 may check if the cross-domain storage 610 includes the token 660 for initializing the application. If the token is absent, the user device 605 may present the login interface as before in order to obtain the token. However, if the token is stored in the cross-domain storage 610 (e.g., based on storing a copy of the token at 635), the user device 605 may retrieve the token from cross-domain storage 610 without repeating the login procedure. At 665, the user device 605 may transmit a request and the retrieved token (e.g., in a header of the request) to the host server 615. The host server 615 may grant access to requested resources for the user device 605 to re-initialize the single-page application in this new webpage based on the request including the token.

Figure 7:
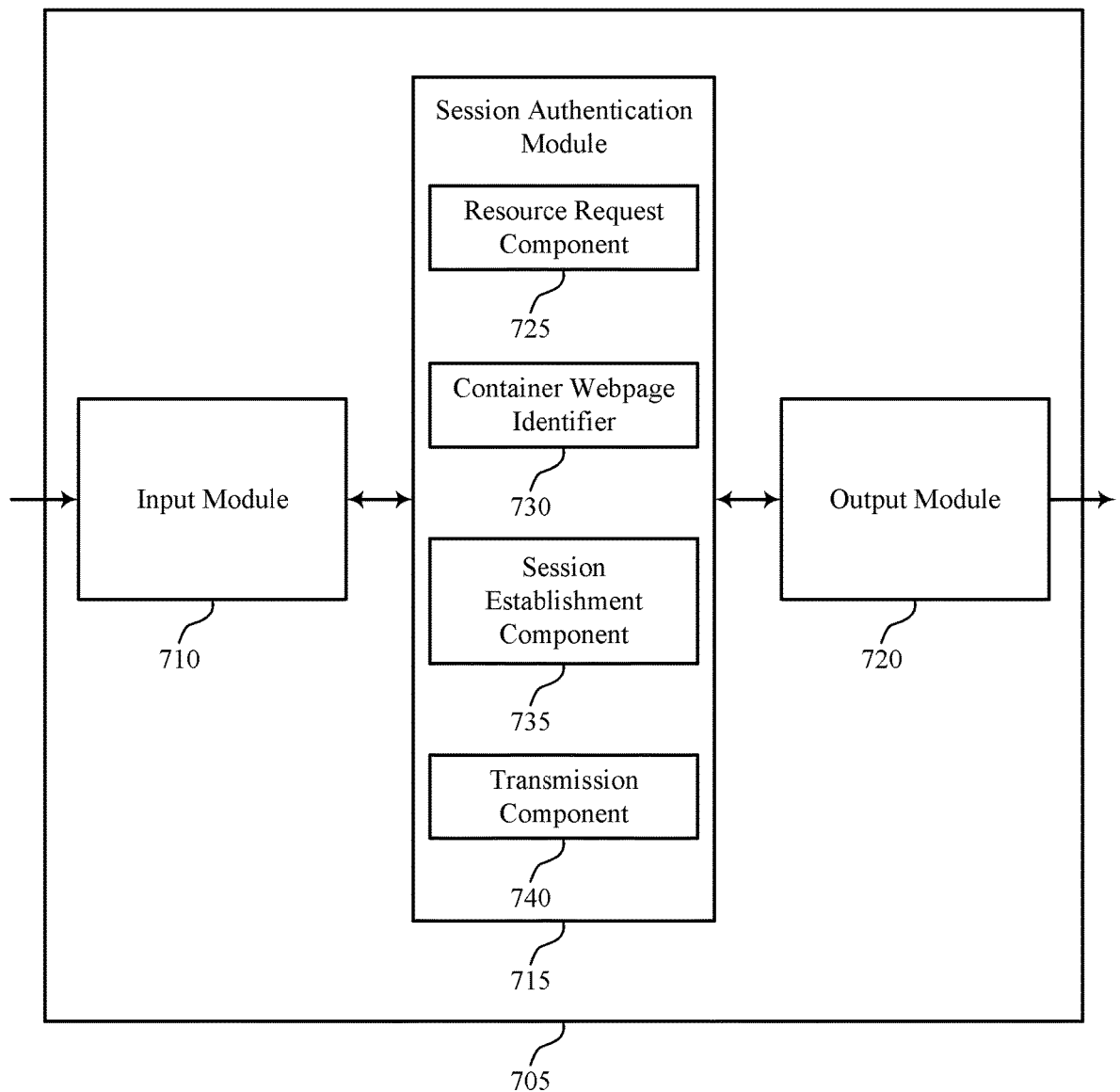
FIGS. 7 and 8 show block diagrams of a device that supports application-specific session authentication in accordance with aspects of the present disclosure.

FIG. 7 shows a block diagram 700 of an apparatus 705 that supports application-specific session authentication in accordance with aspects of the present disclosure. Apparatus 705 may include input module 710, session authentication module 715, and output module 720. Apparatus 705 may also include a processor. Each of these components may be in communication with one another (e.g., via one or more buses). In some cases, apparatus 705 may be an example of a user terminal, a database server, a host server, or a system containing multiple computing devices.

Session authentication module 715 may be an example of aspects of the session authentication module 815 or 915 described with reference to FIGS. 8 and 9.

Session authentication module 715 and/or at least some of its various sub-components may be implemented in hardware, software executed by a processor, firmware, or any combination thereof. If implemented in software executed by a processor, the functions of the session authentication module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The session authentication module 715 and/or at least some of its various sub-components may be physically located at various positions, including being distributed such that portions of functions are implemented at different physical locations by one or more physical devices. In some examples, session authentication module 715 and/or at least some of its various sub-components may be a separate and distinct component in accordance with various aspects of the present disclosure. In other examples, session authentication module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Session authentication module 715 may also include resource request component 725, container webpage identifier 730, session establishment component 735, and transmission component 740.

Resource request component 725 may receive a resource request including a session-identifying token and an indication of requested resources. Container webpage identifier 730 may identify that the resource request is received from a single-page application embedded in a container webpage based on receiving the session-identifying token with the resource request. Session establishment component 735 may establish an application-specific session with the single-page application based on the identifying, where the application-specific session grants the single-page application access to resources associated with the host server. Transmission component 740 may transmit, to the single-page application, the requested resources indicated by the resource request based on the established application-specific session.

Figure 8:
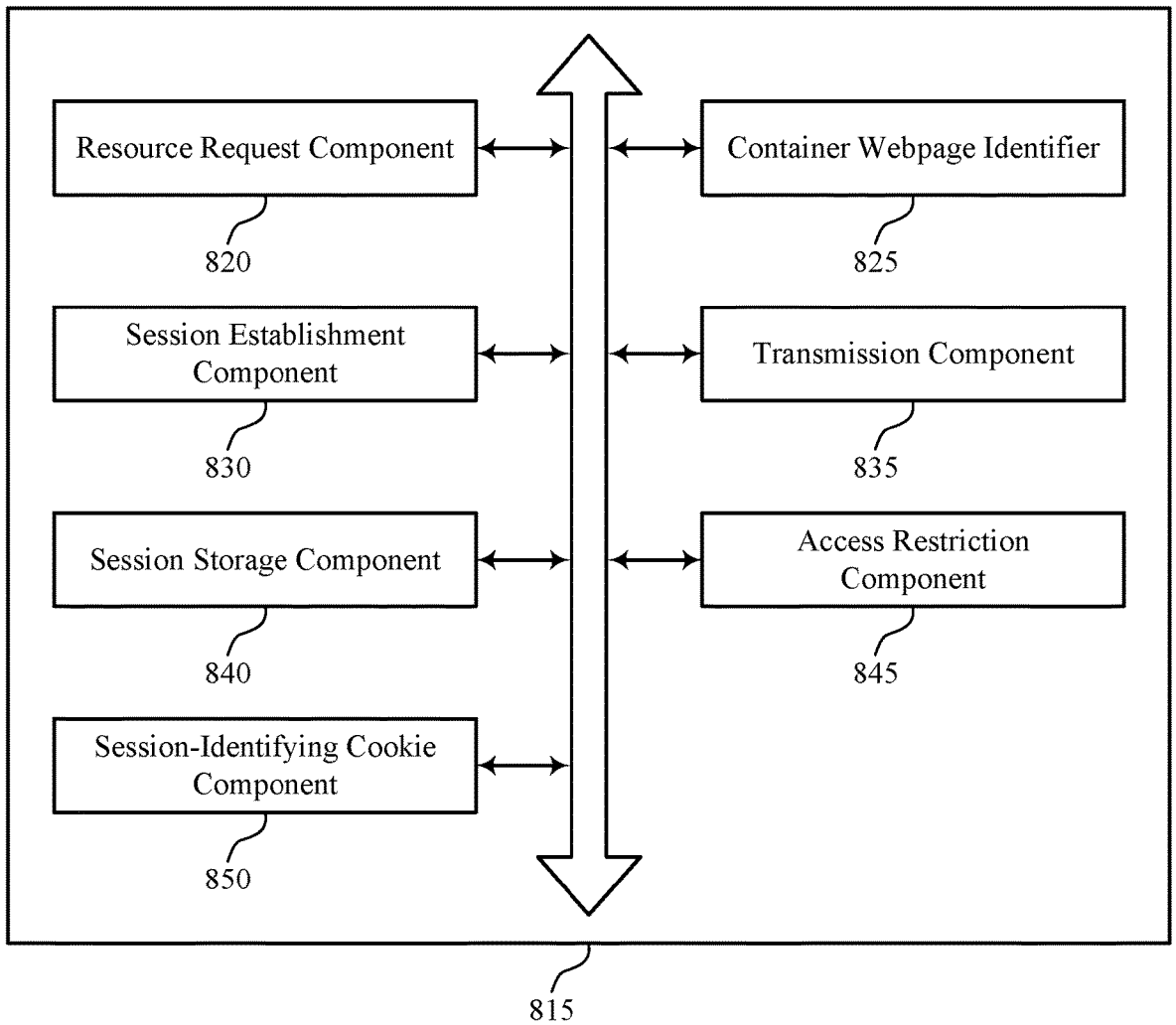

FIG. 8 shows a block diagram 800 of a session authentication module 815 that supports application-specific session authentication in accordance with aspects of the present disclosure. The session authentication module 815 may be an example of aspects of a session authentication module 715 or 915 described with reference to FIGS. 7 and 9. The session authentication module 815 may include resource request component 820, container webpage identifier 825, session establishment component 830, transmission component 835, session storage component 840, access restriction component 845, and session-identifying cookie component 850. Each of these modules may communicate, directly or indirectly, with one another (e.g., via one or more buses).

Resource request component 820 may receive, at a host server, a resource request including a session-identifying token and an indication of requested resources. In some cases, the resource request component 820 may receive, at the host server, an additional resource request referring to a different container webpage than the resource request, where the additional resource request includes the session-identifying token based on cross-domain session storage. In some cases, the session-identifying token may be an OAUTH token. In some cases, the resource request may be an XHR. In some cases, the session-identifying token is included in a header of the resource request.

Container webpage identifier 825 may identify that the resource request is received from a single-page application embedded in a container webpage based on receiving the session-identifying token with the resource request. Container webpage identifier 825 may also identify that the additional resource request is received from the single-page application embedded in the different container webpage based on receiving the session-identifying token with the additional resource request. In some cases, the container webpage corresponds to a first web domain, and the different container webpage corresponds to a second web domain different from the first web domain. In some cases, the container webpage corresponds to a tenant of the host server.

Session establishment component 830 may establish an application-specific session with the single-page application based on the identifying, where the application-specific session grants the single-page application access to resources associated with the host server. In some cases, session establishment component 830 may grant the application-specific session access to a subset of the resources associated with the host server, where the subset of the resources is based on permissions for the single-page application.

Transmission component 835 may transmit, to the single-page application, the requested resources indicated by the resource request based on the established application-specific session.

Session storage component 840 may host cross-domain session storage for the container webpage, store session data for the container webpage in the cross-domain session storage, and store the session-identifying token in the cross-domain session storage based on a user login procedure. Session storage component 840 may also remove the session-identifying token from the cross-domain session storage based on a user logout procedure. In some cases, the application-specific session grants the single-page application access to tenant-specific resources for the tenant and associated with the host server.

Access restriction component 845 may receive, at the host server and from the container webpage, an additional resource request including an indication of additional requested resources associated with the host server. Access restriction component 845 may determine that the additional resource request does not include the session-identifying token, and may restrict access to the additional requested resources based on the determining.

Session-identifying cookie component 850 may transmit, to the container webpage, a session-identifying cookie based on establishing the application-specific session with the single-page application. Session-identifying cookie component 850 may also receive, at the host server, one or more additional resource requests including the session-identifying cookie.

Figure 9:
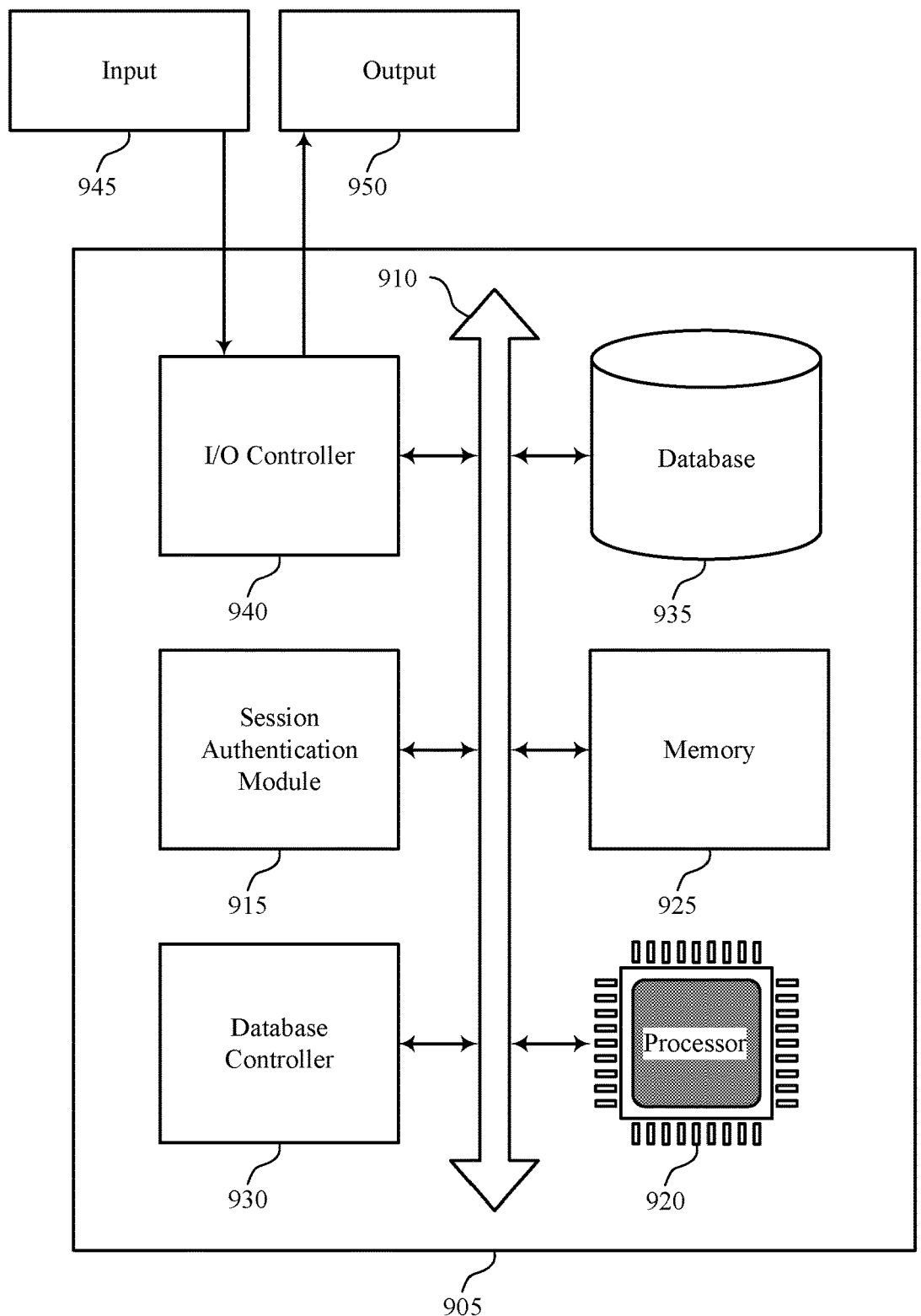
FIG. 9 illustrates a block diagram of a system including a host server that supports application-specific session authentication in accordance with aspects of the present disclosure.

FIG. 9 shows a diagram of a system 900 including a device 905 that supports application-specific session authentication in accordance with aspects of the present disclosure. Device 905 may be an example of or include the components of a host server as described above, e.g., with reference to FIGS. 1 through 6. Device 905 may include components for bi-directional data communications including components for transmitting and receiving communications, including session authentication module 915, processor 920, memory 925, database controller 930, database 935, and I/O controller 940. These components may be in electronic communication via one or more buses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting application-specific session authentication).

Memory 925 may include random access memory (RAM) and read only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

Database controller 930 may manage data storage and processing in database 935. In some cases, a user may interact with database controller 930. In other cases, database controller 930 may operate automatically without user interaction. Database 935 may be an example of a single database, a distributed database, multiple distributed databases, or an emergency backup database.

I/O controller 940 may manage input and output signals for device 905. I/O controller 940 may also manage peripherals not integrated into device 905. In some cases, I/O controller 940 may represent a physical connection or port to an external peripheral. In some cases, I/O controller 940 may utilize an operating system such as iOS®, ANDROID®, MS-DOS®, MS-WINDOWS®, OS/2®, UNIX®, LINUX®, or another known operating system. In other cases, I/O controller 940 may represent or interact with a modem, a keyboard, a mouse, a touchscreen, or a similar device. In some cases, I/O controller 940 may be implemented as part of a processor. In some cases, a user may interact with device 905 via I/O controller 940 or via hardware components controlled by I/O controller 940.

Figure 10:
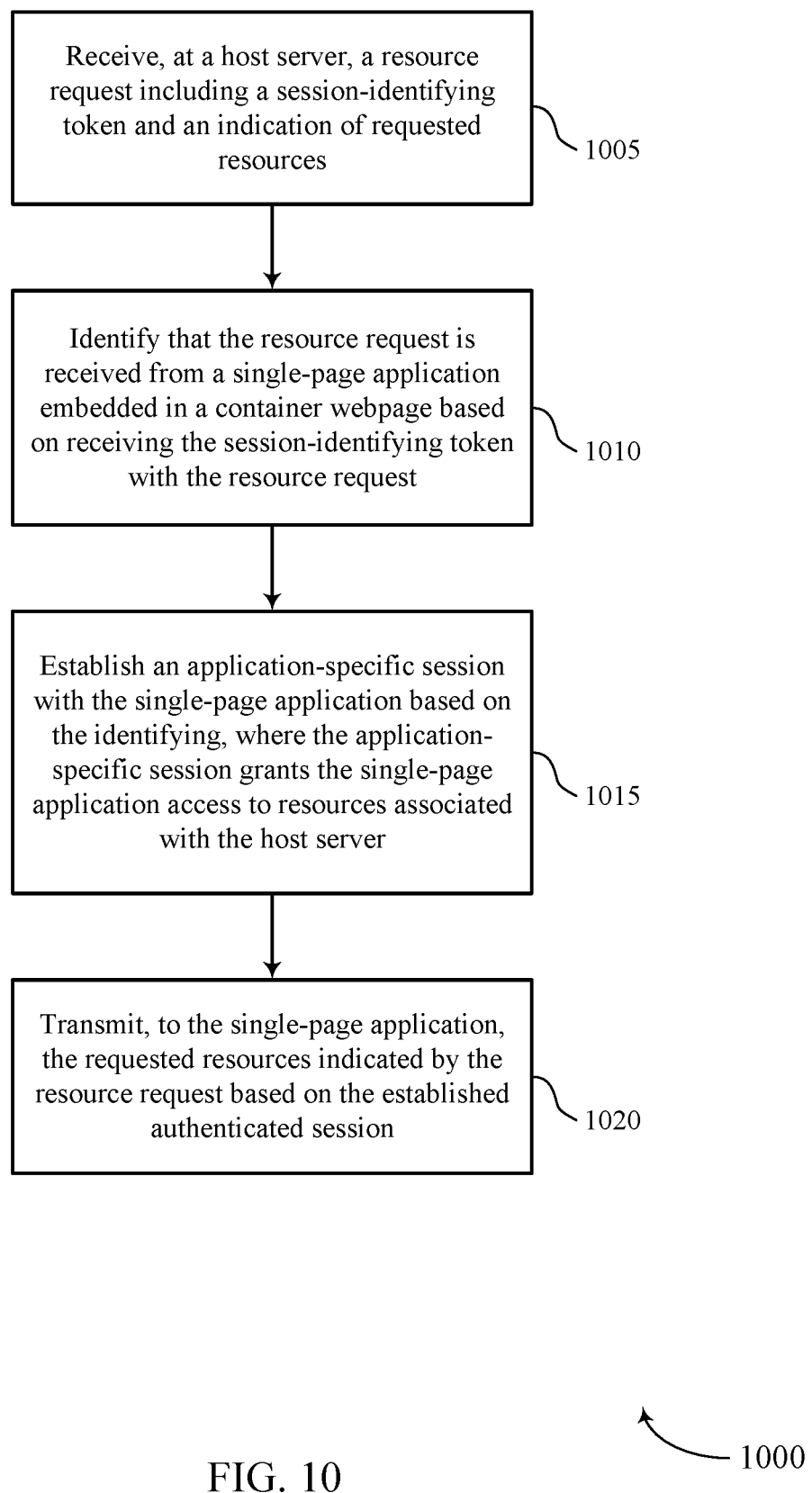
FIGS. 10 through 12 illustrate methods for application-specific session authentication in accordance with aspects of the present disclosure.

FIG. 10 shows a flowchart illustrating a method 1000 for application-specific session authentication in accordance with aspects of the present disclosure. The operations of method 1000 may be implemented by a host server or its components as described herein. For example, the operations of method 1000 may be performed by a session authentication module as described with reference to FIGS. 7 through 9. In some examples, a host server may execute a set of codes to control the functional elements of the device to perform the functions described below. Additionally or alternatively, the host server may perform aspects of the functions described below using special-purpose hardware.

At 1005 the host server may receive a resource request comprising a session-identifying token and an indication of requested resources. The operations of 1005 may be performed according to the methods described herein. In certain examples, aspects of the operations of 1005 may be performed by a resource request component as described with reference to FIGS. 7 through 9.

At 1010 the host server may identify that the resource request is received from a single-page application embedded in a container webpage based at least in part on receiving the session-identifying token with the resource request. The operations of 1010 may be performed according to the methods described herein. In certain examples, aspects of the operations of 1010 may be performed by a container webpage identifier as described with reference to FIGS. 7 through 9.

At 1015 the host server may establish an application-specific session with the single-page application based at least in part on the identifying, wherein the application-specific session grants the single-page application access to resources associated with the host server. The operations of 1015 may be performed according to the methods described herein. In certain examples, aspects of the operations of 1015 may be performed by a session establishment component as described with reference to FIGS. 7 through 9.

At 1020 the host server may transmit, to the single-page application, the requested resources indicated by the resource request based at least in part on the established application-specific session. The operations of 1020 may be performed according to the methods described herein. In certain examples, aspects of the operations of 1020 may be performed by a transmission component as described with reference to FIGS. 7 through 9.

Figure 11:
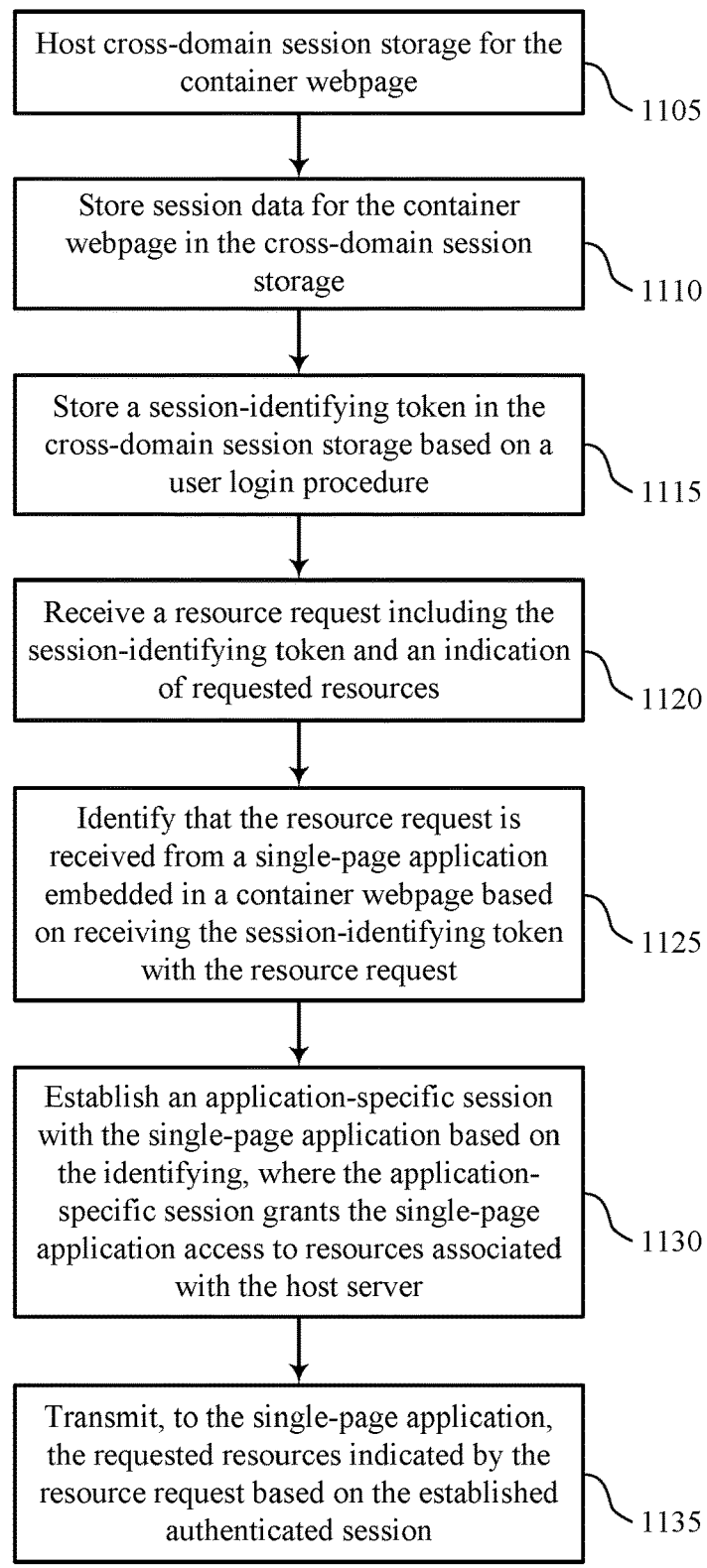

FIG. 11 shows a flowchart illustrating a method 1100 for application-specific session authentication in accordance with aspects of the present disclosure. The operations of method 1100 may be implemented by a host server or its components as described herein. For example, the operations of method 1100 may be performed by a session authentication module as described with reference to FIGS. 7 through 9. In some examples, a host server may execute a set of codes to control the functional elements of the device to perform the functions described below. Additionally or alternatively, the host server may perform aspects of the functions described below using special-purpose hardware.

At 1105 the host server may host cross-domain session storage for the container webpage. The operations of 1105 may be performed according to the methods described herein. In certain examples, aspects of the operations of 1105 may be performed by a session storage component as described with reference to FIGS. 7 through 9.

At 1110 the host server may store session data for the container webpage in the cross-domain session storage. The operations of 1110 may be performed according to the methods described herein. In certain examples, aspects of the operations of 1110 may be performed by a session storage component as described with reference to FIGS. 7 through 9.

At 1115 the host server may store a session-identifying token in the cross-domain session storage based at least in part on a user login procedure. The operations of 1115 may be performed according to the methods described herein. In certain examples, aspects of the operations of 1115 may be performed by a session storage component as described with reference to FIGS. 7 through 9.

At 1120 the host server may receive a resource request comprising the session-identifying token and an indication of requested resources. The operations of 1120 may be performed according to the methods described herein. In certain examples, aspects of the operations of 1120 may be performed by a resource request component as described with reference to FIGS. 7 through 9.

At 1125 the host server may identify that the resource request is received from a single-page application embedded in a container webpage based at least in part on receiving the session-identifying token with the resource request. The operations of 1125 may be performed according to the methods described herein. In certain examples, aspects of the operations of 1125 may be performed by a container webpage identifier as described with reference to FIGS. 7 through 9.

At 1130 the host server may establish an application-specific session with the single-page application based at least in part on the identifying, wherein the application-specific session grants the single-page application access to resources associated with the host server. The operations of 1130 may be performed according to the methods described herein. In certain examples, aspects of the operations of 1130 may be performed by a session establishment component as described with reference to FIGS. 7 through 9.

At 1135 the host server may transmit, to the single-page application, the requested resources indicated by the resource request based at least in part on the established application-specific session. The operations of 1135 may be performed according to the methods described herein. In certain examples, aspects of the operations of 1135 may be performed by a transmission component as described with reference to FIGS. 7 through 9.

Figure 12:
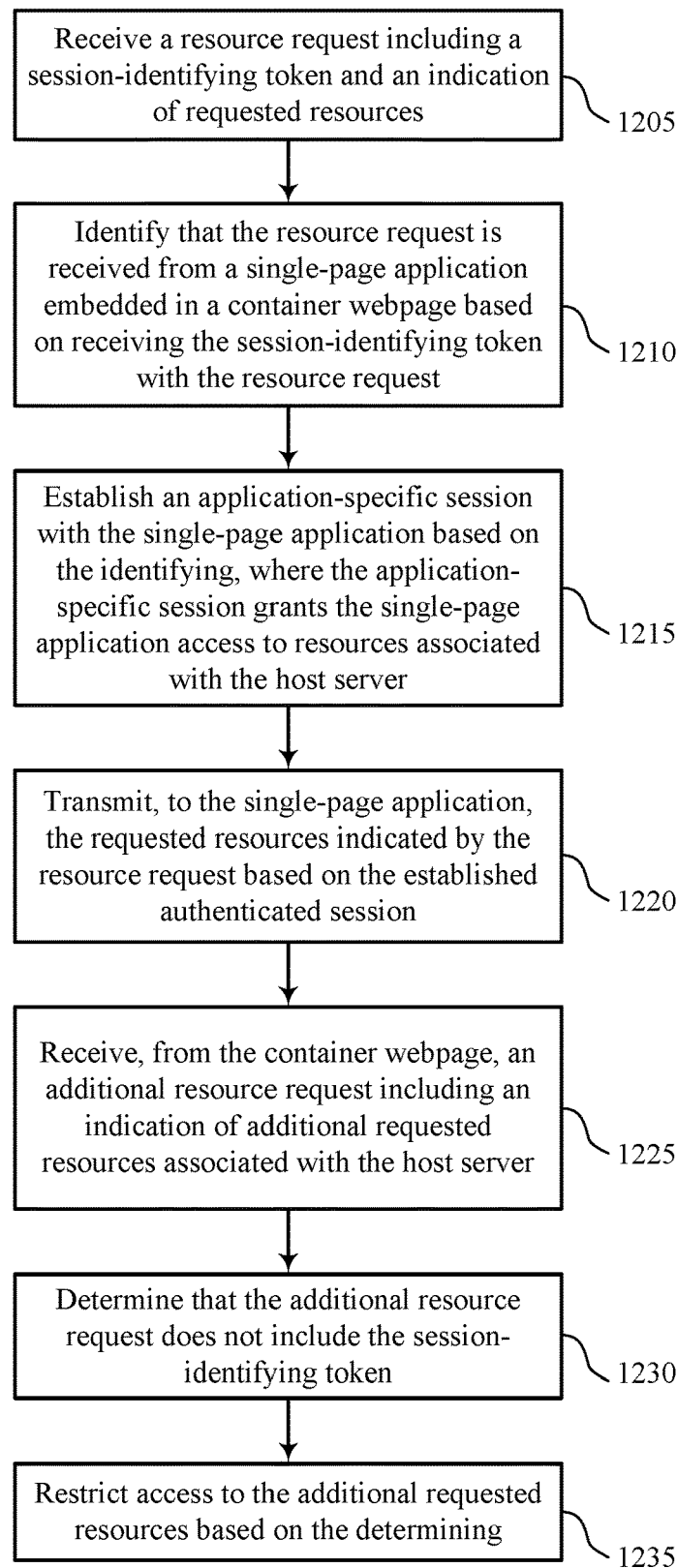

FIG. 12 shows a flowchart illustrating a method 1200 for application-specific session authentication in accordance with aspects of the present disclosure. The operations of method 1200 may be implemented by a host server or its components as described herein. For example, the operations of method 1200 may be performed by a session authentication module as described with reference to FIGS. 7 through 9. In some examples, a host server may execute a set of codes to control the functional elements of the device to perform the functions described below. Additionally or alternatively, the host server may perform aspects of the functions described below using special-purpose hardware.

At 1205 the host server may receive a resource request comprising a session-identifying token and an indication of requested resources. The operations of 1205 may be performed according to the methods described herein. In certain examples, aspects of the operations of 1205 may be performed by a resource request component as described with reference to FIGS. 7 through 9.

At 1210 the host server may identify that the resource request is received from a single-page application embedded in a container webpage based at least in part on receiving the session-identifying token with the resource request. The operations of 1210 may be performed according to the methods described herein. In certain examples, aspects of the operations of 1210 may be performed by a container webpage identifier as described with reference to FIGS. 7 through 9.

At 1215 the host server may establish an application-specific session with the single-page application based at least in part on the identifying, wherein the application-specific session grants the single-page application access to resources associated with the host server. The operations of 1215 may be performed according to the methods described herein. In certain examples, aspects of the operations of 1215 may be performed by a session establishment component as described with reference to FIGS. 7 through 9.

At 1220 the host server may transmit, to the single-page application, the requested resources indicated by the resource request based at least in part on the established application-specific session. The operations of 1220 may be performed according to the methods described herein. In certain examples, aspects of the operations of 1220 may be performed by a transmission component as described with reference to FIGS. 7 through 9.

At 1225 the host server may receive, from the container webpage, an additional resource request comprising an indication of additional requested resources associated with the host server. The operations of 1225 may be performed according to the methods described herein. In certain examples, aspects of the operations of 1225 may be performed by an access restriction component as described with reference to FIGS. 7 through 9.

At 1230 the host server may determine that the additional resource request does not comprise the session-identifying token. The operations of 1230 may be performed according to the methods described herein. In certain examples, aspects of the operations of 1230 may be performed by an access restriction component as described with reference to FIGS. 7 through 9.

At 1235 the host server may restrict access to the additional requested resources based at least in part on the determining. The operations of 1235 may be performed according to the methods described herein. In certain examples, aspects of the operations of 1235 may be performed by an access restriction component as described with reference to FIGS. 7 through 9.

A method of application-specific session authentication is described. The method may include receiving, at a host server, a resource request comprising a session-identifying token and an indication of requested resources, identifying that the resource request is received from a single-page application embedded in a container webpage based at least in part on receiving the session-identifying token with the resource request, establishing an application-specific session with the single-page application based at least in part on the identifying, wherein the application-specific session grants the single-page application access to resources associated with the host server, and transmitting, to the single-page application, the requested resources indicated by the resource request based at least in part on the established application-specific session.

Another apparatus for application-specific session authentication is described. The apparatus may include a processor, memory in electronic communication with the processor, and instructions stored in the memory. The instructions may be operable to cause the processor to receive, at a host server, a resource request comprising a session-identifying token and an indication of requested resources, identify that the resource request is received from a single-page application embedded in a container webpage based at least in part on receiving the session-identifying token with the resource request, establish an application-specific session with the single-page application based at least in part on the identifying, wherein the application-specific session grants the single-page application access to resources associated with the host server, and transmit, to the single-page application, the requested resources indicated by the resource request based at least in part on the established application-specific session.

A non-transitory computer-readable medium for application-specific session authentication is described. The non-transitory computer-readable medium may include instructions operable to cause a processor to receive, at a host server, a resource request comprising a session-identifying token and an indication of requested resources, identify that the resource request is received from a single-page application embedded in a container webpage based at least in part on receiving the session-identifying token with the resource request, establish an application-specific session with the single-page application based at least in part on the identifying, wherein the application-specific session grants the single-page application access to resources associated with the host server, and transmit, to the single-page application, the requested resources indicated by the resource request based at least in part on the established application-specific session.

Some examples of the method, apparatus, and non-transitory computer-readable medium described above may further include processes, features, means, or instructions for hosting cross-domain session storage for the container webpage. Some examples of the method, apparatus, and non-transitory computer-readable medium described above may further include processes, features, means, or instructions for storing session data for the container webpage in the cross-domain session storage.

Some examples of the method, apparatus, and non-transitory computer-readable medium described above may further include processes, features, means, or instructions for storing the session-identifying token in the cross-domain session storage based at least in part on a user login procedure.

In some examples of the method, apparatus, and non-transitory computer-readable medium described above, the resource request refers to the container webpage, the method further comprises receiving, at the host server, an additional resource request referring to a different container webpage, wherein the additional resource request comprises the session-identifying token based at least in part on the cross-domain session storage. Some examples of the method, apparatus, and non-transitory computer-readable medium described above may further include processes, features, means, or instructions for identifying that the additional resource request may be received from the single-page application embedded in the different container webpage based at least in part on receiving the session-identifying token with the additional resource request.

In some examples of the method, apparatus, and non-transitory computer-readable medium described above, the container webpage corresponds to a first web domain, and the different container webpage corresponds to a second web domain different from the first web domain.

Some examples of the method, apparatus, and non-transitory computer-readable medium described above may further include processes, features, means, or instructions for removing the session-identifying token from the cross-domain session storage based at least in part on a user logout procedure.

Some examples of the method, apparatus, and non-transitory computer-readable medium described above may further include processes, features, means, or instructions for receiving, at the host server and from the container webpage, an additional resource request comprising an indication of additional requested resources associated with the host server. Some examples of the method, apparatus, and non-transitory computer-readable medium described above may further include processes, features, means, or instructions for determining that the additional resource request does not comprise the session-identifying token. Some examples of the method, apparatus, and non-transitory computer-readable medium described above may further include processes, features, means, or instructions for restricting access to the additional requested resources based at least in part on the determining.

In some examples of the method, apparatus, and non-transitory computer-readable medium described above, the container webpage corresponds to a tenant of the host server. In some examples of the method, apparatus, and non-transitory computer-readable medium described above, the application-specific session grants the single-page application access to tenant-specific resources for the tenant and associated with the host server.

Some examples of the method, apparatus, and non-transitory computer-readable medium described above may further include processes, features, means, or instructions for transmitting, to the container webpage, a session-identifying cookie based at least in part on establishing the application-specific session with the single-page application. Some examples of the method, apparatus, and non-transitory computer-readable medium described above may further include processes, features, means, or instructions for receiving, at the host server, one or more additional resource requests comprising the session-identifying cookie.

Some examples of the method, apparatus, and non-transitory computer-readable medium described above may further include processes, features, means, or instructions for granting the application-specific session access to a subset of the resources associated with the host server, wherein the subset of the resources may be based at least in part on permissions for the single-page application.

In some examples of the method, apparatus, and non-transitory computer-readable medium described above, the session-identifying token comprises an OAUTH token.

In some examples of the method, apparatus, and non-transitory computer-readable medium described above, the resource request comprises an XHR.

In some examples of the method, apparatus, and non-transitory computer-readable medium described above, the session-identifying token may be included in a header of the resource request.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for application-specific session authentication, comprising:

receiving, at a host server, a resource request comprising a session-identifying token and an indication of requested resources;

identifying that the resource request is received from a single-page application embedded in a first container webpage of a web browser based at least in part on receiving the session-identifying token with the resource request;

establishing an application-specific session with the single-page application based at least in part on the identifying, wherein the application-specific session grants the single-page application access to resources associated with the host server;

transmitting, to the single-page application, the requested resources indicated by the resource request based at least in part on the established application-specific session;

hosting, at the host server, cross-domain session storage specific to the single-page application;

storing, in the cross-domain session storage, the session-identifying token;

identifying a switch, in the web browser, from the first container webpage to a second container webpage of a different domain than the first container webpage; and reloading the single-page application embedded in the second container webpage based at least in part on maintaining the application-specific session using the session-identifying token stored in the cross-domain session storage.

2. The method of claim 1, further comprising:

storing session data for the container webpage, the single-page application, or both in the cross-domain session storage.

3. The method of claim 2, further comprising:

receiving, at the host server, a request to reload the single-page application in the second container webpage; and transmitting the session data stored in the cross-domain session storage based at least in part on the session-identifying token stored in the cross-domain session storage, wherein reloading the single-page application is based at least in part on transmitting the session data.

4. The method of claim 1, wherein the session-identifying token is stored in the cross-domain session storage based at least in part on a user login procedure.

5. The method of claim 4, wherein the resource request refers to the first container webpage, the method further comprising:

receiving, at the host server, an additional resource request referring to the second container webpage, wherein the additional resource request comprises the session-identifying token based at least in part on the cross-domain session storage; and identifying that the additional resource request is received from the single-page application embedded in the second container webpage based at least in part on receiving the session-identifying token with the additional resource request.

6. The method of claim 4, further comprising:

removing the session-identifying token from the cross-domain session storage based at least in part on a user logout procedure.

7. The method of claim 1, further comprising:

receiving, at the host server and from the first container webpage, an additional resource request comprising an indication of additional requested resources associated with the host server;

determining that the additional resource request does not comprise the session-identifying token based at least in part on the additional resource request being from the first container webpage and not from the single-page application embedded in the first container webpage; and restricting access to the additional requested resources based at least in part on the determining.

8. The method of claim 1, wherein:

the first container webpage corresponds to a tenant of the host server; and the application-specific session grants the single-page application access to tenant-specific resources for the tenant and associated with the host server.

9. The method of claim 1, further comprising:

transmitting, to the first container webpage, a session-identifying cookie based at least in part on establishing the application-specific session with the single-page application; and receiving, at the host server, one or more additional resource requests comprising the session-identifying cookie.

10. The method of claim 1, further comprising:

granting the application-specific session access to a subset of the resources associated with the host server, wherein the subset of the resources is based at least in part on permissions for the single-page application.

11. The method of claim 1, wherein the session-identifying token comprises an open authorization (OAUTH) token.

12. The method of claim 1, wherein the resource request comprises an XMLHttpRequest (XHR).

13. The method of claim 1, wherein the session-identifying token is included in a header of the resource request.

14. An apparatus for application-specific session authentication, comprising:

a processor;

memory in electronic communication with the processor; and instructions stored in the memory and executable by the processor to cause the apparatus to:

receive, at a host server, a resource request comprising a session-identifying token and an indication of requested resources;

identify that the resource request is received from a single-page application embedded in a first container webpage of a web browser based at least in part on receiving the session-identifying token with the resource request;

establish an application-specific session with the single-page application based at least in part on the identifying, wherein the application-specific session grants the single-page application access to resources associated with the host server;

transmit, to the single-page application, the requested resources indicated by the resource request based at least in part on the established application-specific session;

host, at the host server, cross-domain session storage specific to the single-page application;

store, in the cross-domain session storage, the session-identifying token;

identify a switch, in the web browser, from the first container webpage to a second container webpage of a different domain than the first container webpage; and reload the single-page application embedded in the second container webpage based at least in part on maintaining the application-specific session using the session-identifying token stored in the cross-domain session storage.

15. The apparatus of claim 14, wherein the instructions are further executable by the processor to cause the apparatus to:

store session data for the container webpage, the single-page application, or both in the cross-domain session storage.

16. The apparatus of claim 14, wherein the instructions are further executable by the processor to cause the apparatus to:

receive, at the host server and from the first container webpage, an additional resource request comprising an indication of additional requested resources associated with the host server;

determine that the additional resource request does not comprise the session-identifying token; and restrict access to the additional requested resources based at least in part on the determining.

17. The apparatus of claim 14, wherein the instructions are further executable by the processor to cause the apparatus to:

transmit, to the first container webpage, a session-identifying cookie based at least in part on establishing the application-specific session with the single-page application; and receive, at the host server, one or more additional resource requests comprising the session-identifying cookie.

18. A non-transitory computer-readable medium storing code for application-specific session authentication, the code comprising instructions executable by a processor to:

receive, at a host server, a resource request comprising a session-identifying token and an indication of requested resources;

identify that the resource request is received from a single-page application embedded in a first container webpage of a web browser based at least in part on receiving the session-identifying token with the resource request;

establish an application-specific session with the single-page application based at least in part on the identifying, wherein the application-specific session grants the single-page application access to resources associated with the host server;

transmit, to the single-page application, the requested resources indicated by the resource request based at least in part on the established application-specific session;

host, at the host server, cross-domain session storage specific to the single-page application;

store, in the cross-domain session storage, the session-identifying token;

identify a switch, in the web browser, from the first container webpage to a second container webpage of a different domain than the first container webpage; and reload the single-page application embedded in the second container webpage based at least in part on maintaining the application-specific session using the session-identifying token stored in the cross-domain session storage.

19. The non-transitory computer-readable medium of claim 18, wherein the instructions are further executable by the processor to:

store session data for the container webpage, the single-page application, or both in the cross-domain session storage.

20. The non-transitory computer-readable medium of claim 18, wherein the instructions are further executable by the processor to:

receive, at the host server and from the first container webpage, an additional resource request comprising an indication of additional requested resources associated with the host server;

determine that the additional resource request does not comprise the session-identifying token; and restrict access to the additional requested resources based at least in part on the determining.

* * * * *